US010026198B2

(12) United States Patent
Qian et al.

(10) Patent No.: US 10,026,198 B2
(45) Date of Patent: Jul. 17, 2018

(54) METHOD, SYSTEM AND ELECTRONIC DEVICE FOR AT LEAST ONE OF EFFICIENT GRAPHIC PROCESSING AND SALIENT BASED LEARNING

(75) Inventors: Qiang Qian, Singapore (SG); Hon Wai Choong, Singapore (SG); Yi Yang, Beijing (CN); Yi Jie Chan, Singapore (SG); Xiaoting Liu, Singapore (SG)

(73) Assignee: Creative Technology Ltd, Singapore (SG)

( * ) Notice: Subject to any disclaimer, the term of this patent is extended or adjusted under 35 U.S.C. 154(b) by 78 days.

(21) Appl. No.: 14/110,583

(22) PCT Filed: Mar. 29, 2012

(86) PCT No.: PCT/SG2012/000108
§ 371 (c)(1),
(2), (4) Date: Oct. 8, 2013

(87) PCT Pub. No.: WO2012/138299
PCT Pub. Date: Oct. 11, 2012

(65) Prior Publication Data
US 2014/0028661 A1 Jan. 30, 2014

(30) Foreign Application Priority Data
Apr. 8, 2011 (SG) .............. 201102536-8

(51) Int. Cl.
*G06T 11/00* (2006.01)
*G06F 17/30* (2006.01)
*G06T 3/40* (2006.01)

(52) U.S. Cl.
CPC ........ *G06T 11/00* (2013.01); *G06F 17/30274* (2013.01); *G06T 3/4038* (2013.01)

(58) Field of Classification Search
USPC .................. 345/418, 620; 382/118, 173, 284
See application file for complete search history.

(56) References Cited

U.S. PATENT DOCUMENTS 6,993,726 B2 1/2006 Rosenholtz et al.
7,986,372 B2 7/2011 Ma et al.
(Continued)

FOREIGN PATENT DOCUMENTS

JP 2004-328577 A 11/2004
JP 2005056390 A 3/2005

OTHER PUBLICATIONS

See Ultimate 3D Carousel AS2 and Advanced 3D Carousel Menu at: <URL: http://web.archive.org/web/20100202032702/http://www.oxylusflash.com/flashfiles/ultimate-3d-carousel-as2?> and at <URL: http://web.archive.org/web/20101228131613/http://www.oxylusflash.com/flashfiles/advanced-3d-carousel-menu> and <URL: http://web.archive.org/web/20101229055436/http://www.oxylusflash.com/files/1001/index.html> published Feb. 2, 2010, Dec. 28, 2010 and Dec. 29, 2010, as per Wayback Engine.
(Continued)

*Primary Examiner* — Kimbinh T Nguyen
(74) *Attorney, Agent, or Firm* — Russell Swerdon; Desmund Gean

(57) ABSTRACT

A method, system and electronic device for efficient graphic processing and display of display data. The electronic device can be configured for processing source data corresponding to at least one digital image. The electronic device includes a processing portion which can be configured for receiving and processing source data in a manner so as to produce output signals associated with a portion of the at least one digital image. The portion of the at least one digital image can be associated with a region of interest. The output signals can be based upon for at least one of producing display data displayable as graphic image and salient based learning.

11 Claims, 11 Drawing Sheets

(56) References Cited

U.S. PATENT DOCUMENTS

| | | |
|---|---|---|
| 8,174,571 B2 | 5/2012 | Hibi et al. |
| 2004/0165789 A1 | 8/2004 | Il |
| 2005/0134719 A1 | 6/2005 | Beck |
| 2006/0064716 A1 | 3/2006 | Sull et al. |
| 2006/0280364 A1 | 12/2006 | Ma et al. |
| 2010/0017733 A1* | 1/2010 | Barros .............. G06F 17/30241 715/766 |
| 2010/0226564 A1 | 9/2010 | Marchesotti et al. |
| 2011/0158558 A1 | 6/2011 | Zhao et al. |
| 2012/0134548 A1* | 5/2012 | Rhoads ................. G06Q 30/06 382/118 |
| 2012/0224743 A1* | 9/2012 | Rodriguez .............. G06T 11/60 382/103 |

OTHER PUBLICATIONS

Suh Bongwon et al., "Automatic thumbnail cropping and its effectiveness", Proceedings of the 16th Annual ACM Symposium on User Interface Software and Technology: Vancouver, Canada, Nov. 2-5, 2003, Jan. 1, 2003, pp. 95-104, vol. 5, No. 2, ACM Press, New York, NY.

\* cited by examiner

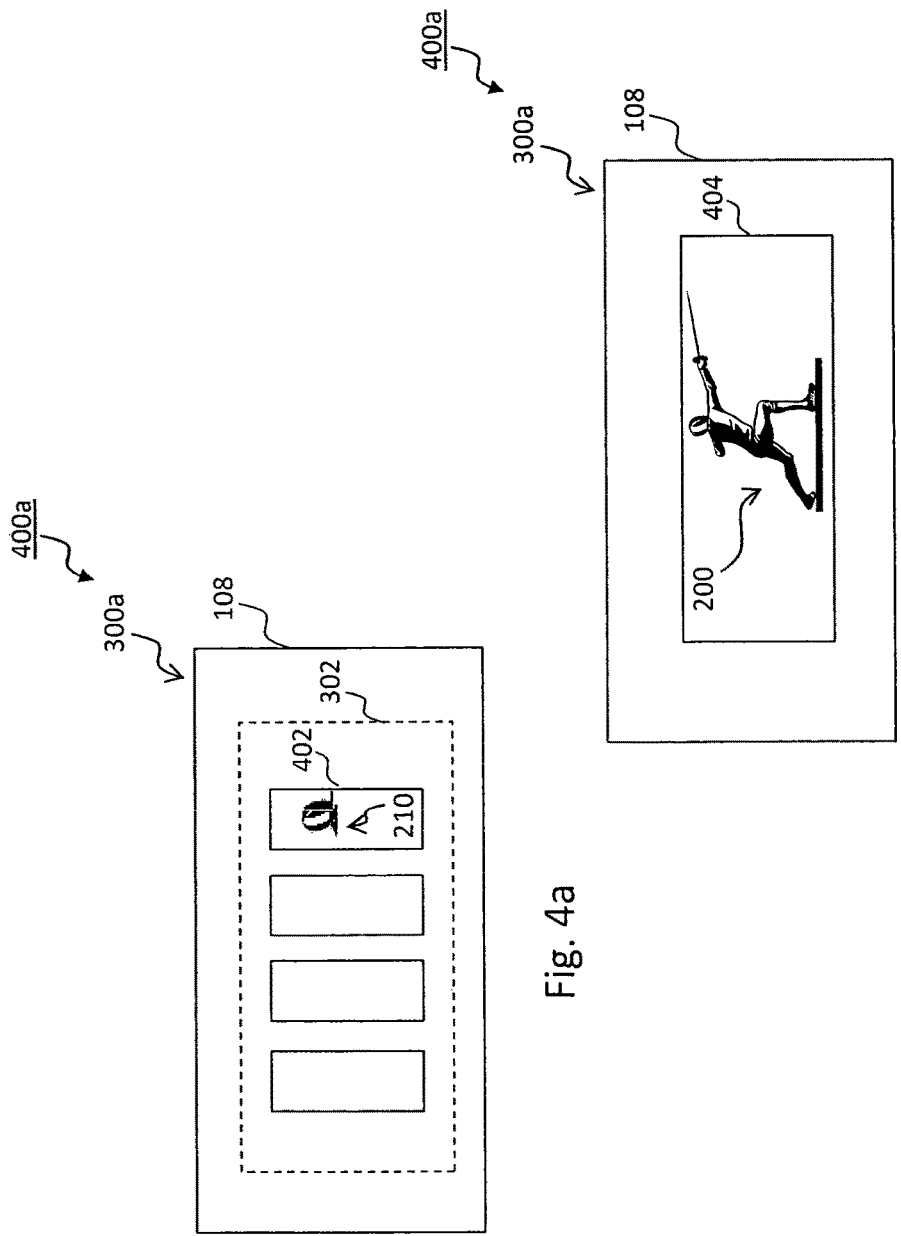

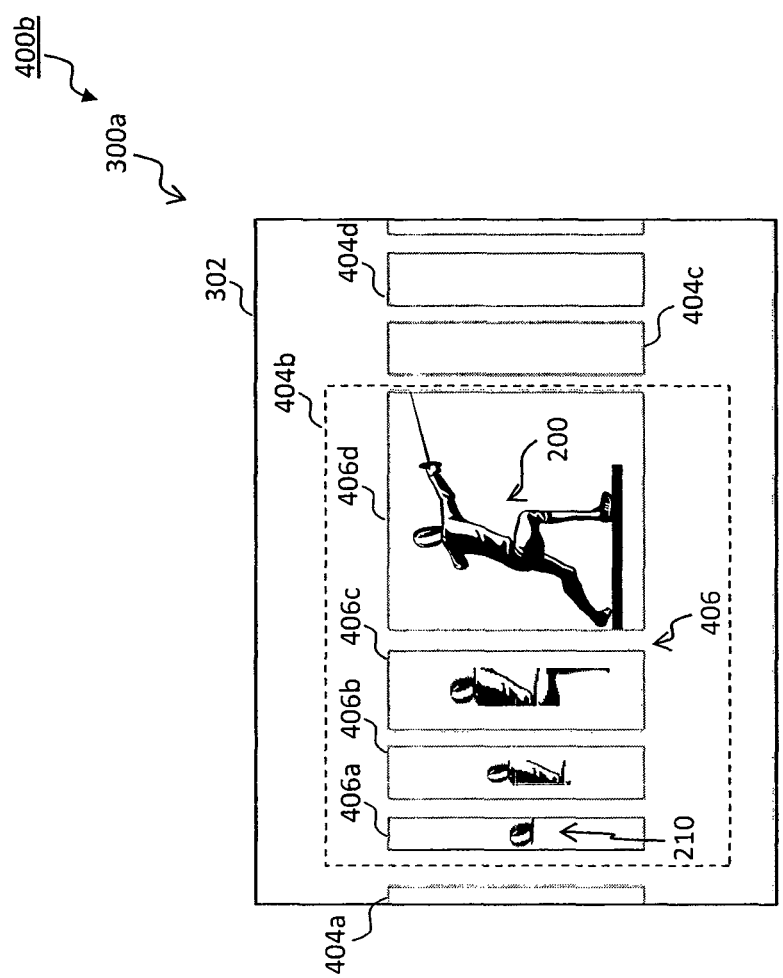

METHOD, SYSTEM AND ELECTRONIC DEVICE FOR AT LEAST ONE OF EFFICIENT GRAPHIC PROCESSING AND SALIENT BASED LEARNING

FIELD OF INVENTION

The present disclosure generally relates to one or both of graphic processing and salient based learning. More particularly, various embodiments of the disclosure relate to a system, an electronic device and a method suitable for at least one of efficient graphic processing and salient based learning.

BACKGROUND

Various advancements in technology have provided avenues for storage of digital images in electronic devices such as a computer. The computer can include a display screen.

Typically, a user may store a plurality of digital images in a computer for later viewing via the display screen of the computer. For the purpose of viewing a digital image from the plurality of digital images, the user may be required to make a selection from the plurality of digital images. In this regard, it may be useful for the user to be able to browse the plurality of digital images prior to making a selection.

Conventional graphic processing and display techniques for facilitating user browsing and selection of a digital image from the plurality of digital images include providing a thumbnail of each of the plurality of digital images. In this regard, a plurality of thumbnails corresponding to the plurality of digital images can be displayed at the display of the computer. Based on the plurality of thumbnails, user browsing may be facilitated in a manner such that the user can associate a thumbnail with a desired digital image. Thereafter, the user can select the thumbnail associated with the desired digital image so that the desired digital image can be viewed.

Typically, a thumbnail of a digital image corresponds to a minimized equivalent of the digital image. For example, a digital image may include a plurality of graphic details. The thumbnail associated to the digital image may also include the plurality of graphic details. In this regard, with respect to the thumbnail, the plurality of graphic details may be reduced in size. In this manner, the thumbnail can correspond to a minimized equivalent of the digital image.

However, a digital image may include so large a number of graphic details such that the thumbnail corresponding thereto may be rendered unsuitable facilitating user browsing for the purpose of selecting a desired digital image from the plurality of digital images.

Thus appreciably, conventional graphic processing and display techniques fail to facilitate user browsing and selection in a suitably efficient manner.

It is therefore desirable to provide a solution to address at least one of the foregoing problems of conventional graphic processing and display techniques.

SUMMARY OF THE INVENTION

In accordance with a first aspect of the disclosure, an electronic device configurable for processing source data corresponding to at least one digital image is provided. The electronic device includes a processing portion.

The processing portion can be configured for receiving and processing source data in a manner so as to produce output signals associable with a portion of the at least one digital image. The portion of the at least one digital image can be associated with a region of interest.

The output signals can be based upon for at least one of producing display data displayable as graphic image and salient based learning.

In accordance with a second aspect of the disclosure, a method for processing source data corresponding to at least one digital image is provided. The method includes processing source data. The method further includes at least one of displaying graphic image and communicating indication signals.

Source data can be processed in a manner so as to produce output signals associable with a portion of the at least one digital image. The portion of the at least one digital image can be associated with a region of interest.

Graphic image can be displayed such that a graphic image corresponding to the region of interest can be displayed as display data. The output signals can be based upon to produce display data.

Indication signals can be communicated. The output signals can be processed in a manner so as to produce indication signals.

In accordance with a third aspect of the disclosure, an electronic device configurable for processing source data corresponding to a plurality of digital images is provided. The electronic device includes a processing portion and a display portion. The display portion can be coupled to the processing portion.

The processing portion can be configured for receiving and processing source data in a manner so as to produce output signals associable with a portion of each of the plurality of digital images. Each of a portion of each of the plurality of digital images can be associated with a region of interest.

The display portion can be configured to receive and process the output signals in a manner so as to produce display data. The display data can be displayed as graphic image corresponding to a selection list. The selection list can correspond to an array of selection options. The array of selection options can include a plurality of selection options.

A selection option from the plurality of selection options can be associated with a region of interest associable with a portion of a digital image from the plurality of digital images.

BRIEF DESCRIPTION OF THE DRAWINGS

Embodiments of the disclosure are described hereinafter with reference to the following drawings, in which:

FIG. 1 shows a system which includes a source portion, a processing portion, a control portion, a display portion and an output module, according to an embodiment of the disclosure;

FIG. 2 shows a digital image corresponding to source data communicable from the source portion of the system of FIG. 1, according to an embodiment of the disclosure;

FIG. 3*a* to FIG. 3*d* show, respectively, a first presentation scheme, a second presentation scheme, a third presentation scheme and a fourth presentation scheme, according to an embodiment of the disclosure;

FIG. 4*a* and FIG. 4*b* show a first display scheme in association with display of digital image, according to an embodiment of the disclosure;

FIG. 4*c* shows a second display scheme in association with display of digital image, according to an embodiment of the disclosure;

DETAILED DESCRIPTION

Representative embodiments of the disclosure for addressing one or more of the foregoing problems associated with conventional graphic processing and display techniques are described hereinafter with reference to FIG. 1 to FIG. 7.

Figure 1:
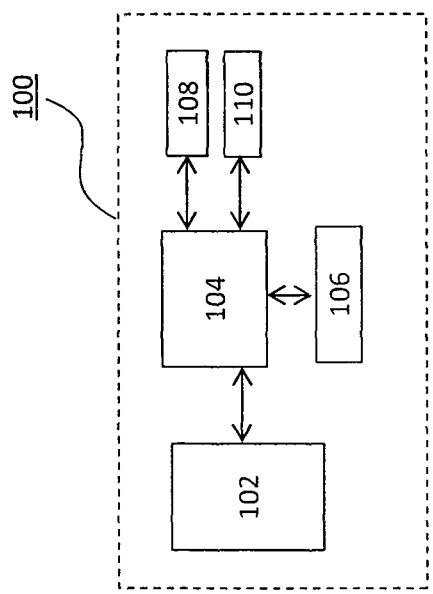

A system 100 is shown in FIG. 1, in accordance with an embodiment of the disclosure. In one embodiment, the system 100 can be configured for graphic processing and display of display data. In another embodiment, the system 100 can be configured for salient based learning. In yet another embodiment, the system 100 can be configured for graphic processing and display of display data, and salient based learning.

The system 100 includes a source portion 102 and a processing portion 104. The system 100 can further include a control portion 106. The system 100 can yet further include one or both of a display portion 108 and an output module 110. The source portion 102 can be coupled to the processing portion 104. The processing portion 104 can be coupled to the control portion 106. Additionally, the processing portion 104 can be coupled to one or both of the display portion 108 and the output module 110.

In one embodiment, the source portion 102 can be configured to communicate source data to the processing portion 104. Based on the source data communicated to the processing portion 104, the processing portion 104 can be configured to process the source data in a manner so as to produce output signals.

In another embodiment, the source portion 102 can be configured to communicate source data to the processing portion 104. The control portion 106 can be configured to communicate control signals to the processing portion 104. Based on control signals communicated from the control portion 106, the processing portion 104 can be configured to process the source data in a manner so as to produce output signals Processing of source data by the processing portion 104 can be associated with graphic processing. Processing of source data by the processing portion 104 will be discussed later in further detail with reference to FIG. 2.

Output signals can preferably be communicated from the processing portion 104 to the display portion 108. The display portion 108 can be configured to receive and process output signals from the processing portion 104 in a manner so as to produce display data. Display data can be displayed via the display portion 108 as graphic image as will be discussed in further detail with reference to FIG. 3.

Output signals can alternatively be further processed by, for example, the processing portion 104 for salient based learning in a manner so as to produce indication signals. The indication signals can be communicated from the processing portion 104 to the output module 110 which can be one or both of hardware based or software based. For example, output signals can be further processed by the processing portion 104 in a manner so as to learn user preference. In this regard, the indication signals can correspond to the user preference. Thus salient based learning can be associated with learning of user preference as will be discussed later in further detail with reference to FIG. 6.

Figure 2:
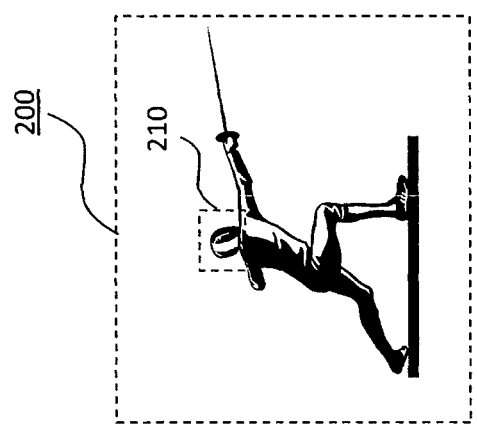

As shown in FIG. 2, source data communicated from the source portion 102 can correspond to a digital image 200.

Earlier mentioned, the processing portion 104 can be configured to process source data communicated from the source portion 102 in a manner so as to produce output signals.

Specifically, the processing portion 104 can be configured to process the digital image 200 in a manner such that the output signals can be associated with at least a portion of the digital image 200. The at least a portion of the digital image 200 can correspond to a region of interest 210. In this regard, the region of interest 210 can correspond to display data displayable at the display portion 108.

In one example, the processing portion 104 can be configured to process the digital image 200 via salient region detection and segmentation based techniques for producing output signals. In another example, the processing portion 104 can be configured to process the digital image 200 via cropping based techniques for producing output signals. In yet another example, the processing portion 104 can be configured to process the digital image 200 via a combination of the aforementioned salient region detection and segmentation based techniques and the aforementioned cropping based techniques, for producing output signals.

The processing portion 104 can be configured to process source data via one or both of a first processing scheme and a second processing scheme. Each of the first and second processing schemes can be associated with one or both of the aforementioned salient region detection and segmentation based techniques and the aforementioned cropping based techniques.

In the first processing scheme, the processing portion 104 can be configured to process source data via automatic detection based processing. In the second processing scheme, the processing portion 104 can be configured to process source data via manual detection based processing.

With regard to the first processing scheme, the processing portion 104 can, in one example, be associated with default settings. The default settings can, in one example, be indicative of user preference that the region of interest 210 should correspond to the head of a person in the digital image 200. In this regard, output signals can be associated with an image associated with the head of the person. The default settings can, in another example, be based on one or more default parameters such as center of the digital image 200, foreground of the digital image 200 and background of the digital image 200. The one or more default parameters can correspond to one or more salient metrics associated with the digital image 200. Thus the region of interest 210 can correspond to one or more salient metrics associated with the digital image 200. In this regard, output signals can be associated with an image associated with one or more salient metrics associated with the digital image 200.

Further with regard to the first processing scheme, the processing portion 104 can, in another example, be associated with self-learning based settings. For example, the processing portion 104 can be configured such that the self-learning based settings can, for example, be based on one or more instances where a user zooms into a region of the digital image 200. In this regard, the self-learning based settings can be based on user's zoom interaction relative to the digital image 200. For example, if there are one or more instances where a user zooms into a region of the digital image 200, it is appreciable that the region may be of significant interest to the user. Thus the region which is zoomed into by the user can be regarded as the region of interest 210. Therefore, output signals can be associated with an image associated the region of the digital image 200 which a user zooms into at one or more instance.

Yet further with regard to the first processing scheme, the processing portion 104 can, in another example, be associated with user preference settings.

In one example, control signals indicative of user preference, that the region of interest 210 should correspond to the head of a person in the digital image 200, can be communicated from the control portion 106. In this regard, control signals communicated from the control portion 106 can be associated with user preference settings. Thus the user preference settings can be indicative of user preference that the region of interest 210 should correspond to the head of a person in the digital image 200. Thus output signals can be associated with an image associated with the head of the person.

In another example, control signals indicative of user preference, that the region of interest 210 should correspond to a context of the digital image 200, can be communicated from the control portion 106. Thus the user preference settings can be context-based. Examples of context of the digital image 200 can include location or time. For example, with regard to context based on time, a user may prefer images associated with the nighttime. In this regard, the region of interest 210 can correspond to a context of the digital image 200, which is associated with the nighttime, such as the moon or lighted street lamps. Further for example, with regard to context based on time, another user may prefer images associated with the daytime. In this regard, the region of interest 210 can correspond to a context of the digital image 200, which is associated with the daytime, such as the sun. Yet further for example, with regard to context based on location, the location can be an image of the environment associated with the digital image 200. In this regard, the source portion 102 can, for example, be a global positioning system (GPS) capable of communicating a digital image 200 corresponding to an image of an environment having sign-boards carrying road-names or building names. Thus the region of interest 210 can correspond to a context of the digital image 200 such as at least one of the sign-boards of the environment associated with the digital image 200.

Thus, based on one or both of default settings and user preference settings, the processing portion 104 can be configured to detect the region of interest 210 associated with the digital image 200. Based on the detected region of interest 210, output signals corresponding thereto can be communicated from the processing portion 104

Therefore, in the context of salient region detection and segmentation based techniques, salient region detection and segmentation based techniques can be associated with detection of the region of interest 210. Salient region detection and segmentation based techniques can be further associated communicating output signals corresponding to the detected region of interest 210.

Furthermore, in the context of cropping based techniques, detection of the region of interest 210 can be associated with selection of a region on the digital image 200. The processing portion 104 can be further configured to crop the digital image 200 based on the region of interest 210 to produce a cropped digital image. The processing portion 104 can yet be further configured to communicate output signals corresponding to the cropped digital image.

Appreciably, based on one or both of default settings and user preference settings, the processing portion 104 can be configured to automatically detect the region of interest 210 associated with the digital image 200. Thus, output signals can be produced by the processing portion 104 and communicated therefrom in an automatic manner. In this regard, the first processing scheme can be associated with automatic detection based processing.

With regard to the second processing scheme, a user can, via the control portion 106, communicate control signals to the processing portion 104 in a manner so as to manually select a portion of the digital image 200. In this regard, the manually selected portion of the digital image 200 can correspond to the region of interest 210.

Based on the manual selection of a portion of the digital image 200, the processing portion 104 can be configured to process the digital image 200 by segmenting or cropping the digital image 200 in a manner so as produce output signals.

Thus, where applicable, the foregoing discussion pertaining to the aforementioned salient region detection and segmentation based techniques, and cropping based techniques analogously applies.

Appreciably, in the second processing scheme, the processing portion 104 can be configured to produce output signals based on manual selection of a portion of the digital image 200. In this regard, the second processing scheme can be associated with manual detection based processing.

Earlier mentioned, display data can be displayed via the display portion 108 as graphic image. Furthermore, as discussed with reference to FIG. 2, source data communicated from the source portion 102 can correspond to a digital image 200. It is appreciable that source data communicated from the source portion 102 can correspond to a plurality of digital images. Additionally, each of the plurality of digital images can be associated with a region of interest.

Display data can be displayed at the display portion 108 via one or more presentation schemes as will be discussed in further detail with reference to FIG. 3a to FIG. 3d hereinafter.

As mentioned above, display data displayed via the display portion 108 can correspond to a region of interest associated with each of a plurality of digital images. The region of interest associated with each of a plurality of digital images can be displayed via the display portion 108 as a selection list 300. Thus display data can correspond to the selection list 300.

Figure 3A:
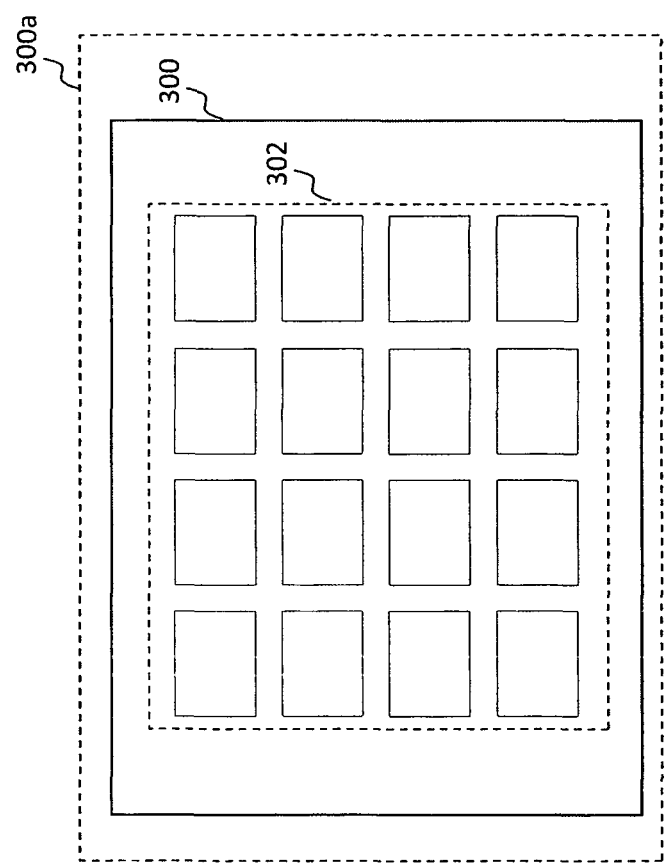
Figure 3B:
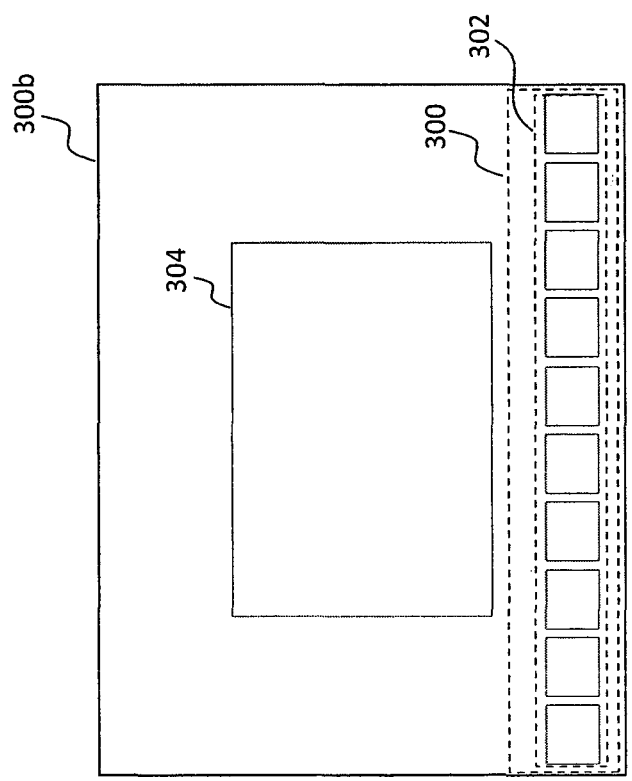
Figure 3C:
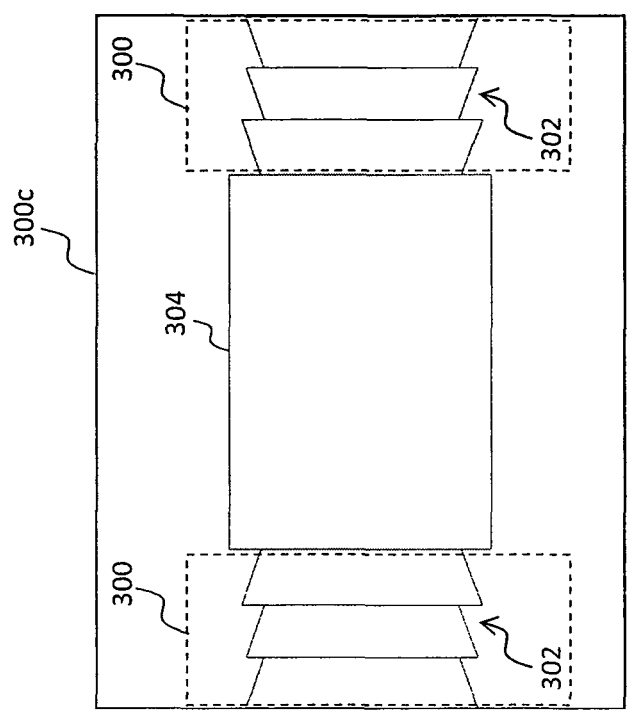
Figure 3D:
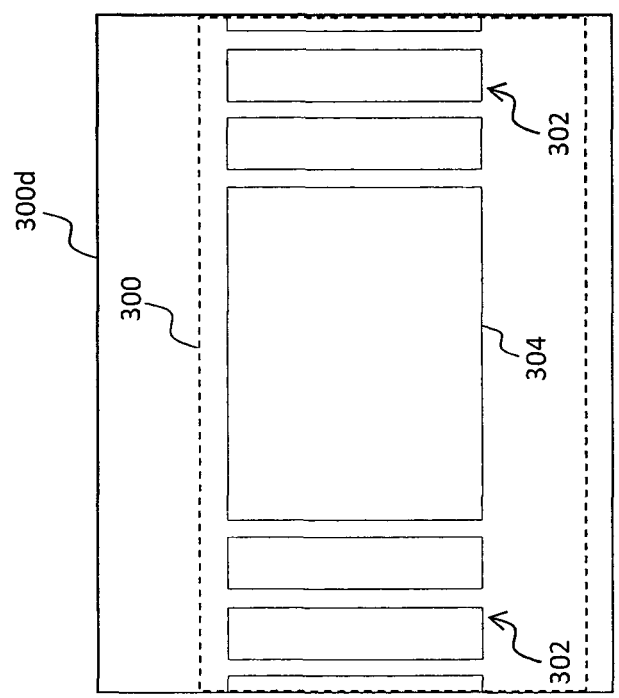

FIG. 3a shows a first presentation scheme 300a in association with the selection list 300. FIG. 3b shows a second presentation scheme 300b in association with the selection list 300. FIG. 3c shows a third presentation scheme 300c in association of the selection list 300. FIG. 3d shows a fourth presentation scheme 300d in association with the selection list 300.

Referring to FIG. 3a, in the first presentation scheme 300a, the selection list 300 can correspond to an array of selection options 302. The array of selection options 302 can include a plurality of selection options. Each of the plurality of selection options can correspond to a region of interest associated with a digital image from the plurality of digital images. Based on the array of selection options 302, a selection option can be selected. Based on the selection option selected, a digital image corresponding to the selection option can be displayed as will be discussed later in further detail, with reference to FIG. 4. In this regard, in addition to the selection list 300, display data can further correspond to the digital image corresponding to the selection option. Furthermore, control signals can be communicated from the control portion 106 for selecting a selection option from the array of selection options 302.

Referring to FIG. 3b, the second presentation scheme 300b can, in addition to being associated with the selection list 300, be further associated with a preview portion 304. The selection list 300 can correspond to the aforementioned array of selection options 302. In this regard, the foregoing pertaining to the array of selection options 302 analogously applies.

In the second presentation scheme 300b, the array of selection options 302 and the preview portion 304 can be displayed in a plane based manner such that they can be visually perceived to be two dimensional (2D). Additionally, the preview portion 304 can display a digital image, corresponding to the selected selection option, in a manner so as to provide a preview of the digital image. In this regard, in addition to the selection list 300 and the digital image corresponding to the selection option, display data can further correspond to the preview portion 304.

Referring to FIG. 3c, the third presentation scheme 300c can, as with the second presentation scheme 300b, be further associated with the preview portion 304 in addition to being associated with the selection list 300. In this regard, the foregoing, where applicable, pertaining to the array of selection options 302 and the preview portion 304 analogously applies.

In the third presentation scheme 300c, the array of selection options 302 and the preview portion 304 can be displayed in, for example, a fanning based arrangement such that they can be visually perceived to be third dimensional (3D).

Thus the second and third presentation schemes 300b/300c differ in the manner in which the array of selection options 302 and the preview portion 304 can be displayed. Specifically, the second presentation scheme 300b can be associated with 2D based display of the array of selection options 302 and the preview portion 304 whereas the third presentation scheme 300c can be associated with 3D based display of the array of selection options 302 and the preview portion 304.

Referring to FIG. 3d, for the fourth presentation scheme 300d, the selection list 300 can correspond to a combination of the array of selection options 302 and the preview portion 304. Specifically, a portion of the array of selection options 302 can correspond to the preview portion 304. In this regard, the foregoing, where applicable, pertaining to the array of selection options 302 and the preview portion 304 analogously applies.

Earlier mentioned in association with any of the above discussed first to fourth presentation schemes 300a/300b/300c/300d, based on a selection option selected, a digital image corresponding to the selection option can be displayed.

Display of digital image corresponding to the selection option will be discussed in further detail, with reference to FIG. 4a, FIG. 4b, FIG. 4c and FIG. 4d hereinafter.

Additionally, for the purposes of brevity, display of a digital image corresponding to a selected selection option, as shown in FIG. 4a to FIG. 4d will be discussed hereinafter with reference to the first presentation scheme 300a. It is appreciable that the discussion hereinafter can also be applicable to any of the second to fourth presentation schemes 300b/300c/300d.

Referring to FIG. 4a to FIG. 4d, display of a digital image based on the selection option selected can be associated with a first display scheme 400a, a second display scheme 400b and a third display scheme 400c.

Figure 4D:
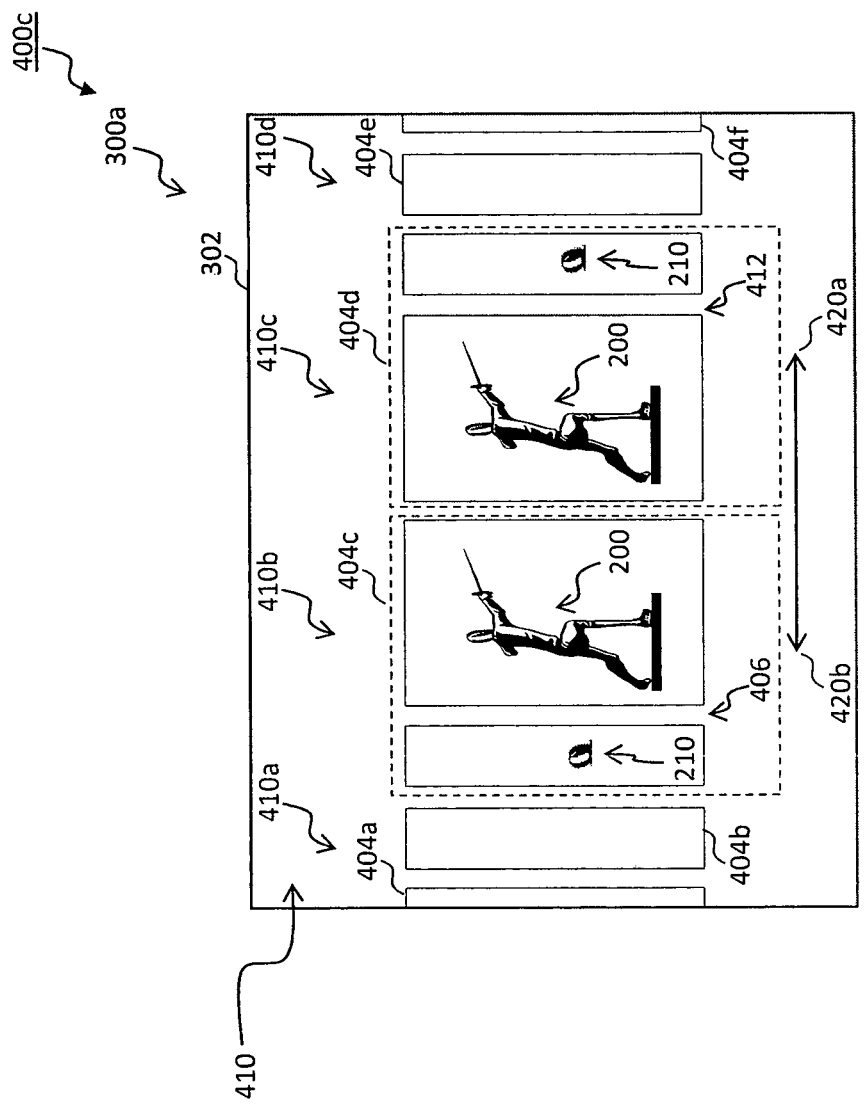
FIG. 4d shows a third display scheme in association with display of digital image, according to an embodiment of the disclosure.

The first display scheme 400a is shown with reference to FIG. 4a and FIG. 4b. FIG. 4c shows the second display scheme 400b and FIG. 4d shows the third display scheme 400c.

The first display scheme 400a can be associated with discrete based transition. The second display scheme 400b can be associated with a first type gradual based transition. The third display scheme 400c can be associated with a second type gradual based transition.

In general, the discrete based transition, the first type gradual based transition and the second type gradual based transition can each be associated with at least visual perception of graphic expansion of a selection option, selected from the array of selection options 302, to an expanded digital image corresponding to the selection option selected. In this regard, a selection option can be associated with the aforementioned region of interest 210 and the expanded digital image can be associated with the aforementioned digital image 200.

Referring to FIG. 4a and FIG. 4b, the first display scheme 400a can be associated with a single expansion stage. For example, as shown in FIG. 4a, the array of selection options 302 can be displayed at the display portion 108. A selection option 402 can be selected from the array of selection options 302. As shown in FIG. 4b, based on the selected selection option 402, an expanded digital image 404 corresponding thereto is displayed at the display portion 108. Thus the selected selection option 402 from the array of selection options 302 can be visually perceived to be graphically expanded to the expanded digital image 404 in a single expansion stage.

In this regard, either only the selection option 402 or the expanded digital image 404 corresponding thereto can be displayed at the display portion 108. In this manner, the first display scheme 400a can be associated with discrete based transition. Further as shown, the selected selection option 402 can be associated with the aforementioned region of interest 210 and the expanded digital image 404 can be associated with the aforementioned digital image 200.

Referring to FIG. 4c, the second display scheme 400b can be associated with a plurality of expansion stages 406.

Specifically, the second display scheme 400b can be associated with a first type gradual based transition such that a selected selection option from the array of selection options 302 can be visually perceived to be graphically expanded to an expanded digital image via a plurality of expansion stages 406. The expanded digital image can correspond to the aforementioned digital image 200 associated with the selection option. In this regard, the selection option can be associated with the region of interest 210.

More specifically, the plurality of expansion stages 406 can be associated with visual perception of graphic expansion of a selected option, which can be associated with the region of interest 210, such that increasing portions of the aforementioned digital image 200 corresponding to the region of interest 210 are gradually displayed via the plurality of expansion stages 406 until an expanded digital image corresponding to the aforementioned digital image 200 is displayed. The plurality of expansion stages 406 will be discussed in further detail with reference to an exemplary scenario hereinafter.

In a first exemplary scenario, the plurality of expansion stages 406 can include a first expansion stage 406a, a second expansion stage 406b, a third expansion stage 406c and a fourth expansion stage 406d. The array of selection options 302 can include a first selection option 404a, a second selection option 404b, a third selection option 404c and a fourth selection option 404d. The second selection option 404b can be selected. Thus the second selection option 404b can be a selected selection option from the array of selection options 302.

Further in the first exemplary scenario, after the second selection option 404b is selected, the second selection option 404b can be visually perceived to be gradually expanded via the first, second, third and fourth expansion stages 406a/406b/406c/406d. Specifically, in the first expansion stage 406a, a portion of the digital image corresponding to the aforementioned region of interest 210 can be displayed. In the second expansion stage 406b, a further portion of the digital image can be displayed. In the third expansion stage 406c, a yet further portion of the digital image can be displayed. In the fourth expansion stage 406d, an expanded digital image corresponding to the aforementioned digital image 200 can be displayed.

Referring to FIG. 4d, the third display scheme 400c tan be associated with a plurality of display regions 410. For example, the third display scheme 400c can be associated with a first display region 410a, a second display region 410b, a third display region 410c and a fourth display region 410d.

Furthermore, as with the second display scheme 400b, the third display scheme 400c can be associated with the plurality of expansion stages 406. In this regard, the foregoing pertaining to the plurality of expansion stages 406 analogously applies. Additionally, the third display scheme 400c can be associated with a plurality of shrinking stages 412. The plurality of shrinking stages 412 can be similar to the plurality of expansion stages with the exception that instead of being associated with graphic expansion, the plurality of shrinking stages 412 can be associated with graphic shrinking.

Particularly, as earlier mentioned, the plurality of expansion stages 406 can be associated visual perception of graphic expansion of a selected option, which can be associated with the region of interest 210, such that increasing portions of the aforementioned digital image 200 corresponding to the region of interest 210 are gradually displayed via the plurality of expansion stages 406 until an expanded digital image corresponding to the aforementioned digital image 200 is displayed. In this regard, the plurality of shrinking stages 412 can be the converse of the plurality of expansion stages 406 such that decreasing portions of the aforementioned digital image 200 are gradually displayed until a selection option corresponding to the region of interest 210 is displayed. Thus, the plurality of shrinking stages 412 can be associated with visual perception of gradual graphic shrinking of the aforementioned digital image 200 to a selection option corresponding to the region of interest 210.

In the third display scheme 400c, the array of selection options 302 can, for example, include the aforementioned first to fourth selection options 404a/404b/404c/404d. The array of selection options 302 can, for example, further include a fifth selection option 404e and a sixth selection option 404f.

The third display scheme 400c can be associated with a second type gradual based transition such that the array of selection options 302 can be visually perceived to be position shifted in either a first direction 420a or a second direction 420b. The first direction 420a can oppose the second direction 420b. Thus the second type gradual based transition can be associated with one or both of the plurality of expansion stages 406 and the plurality of shrinking stages 412 when the array of selection options 302 can be visually perceived to be position shifted in either the first direction 420a or the second direction 420b, as will be discussed in further detail with reference to another exemplary scenario hereinafter.

In a second exemplary scenario, the first and second selection options 404a/404b can initially be displayed as being positioned at the first display region 410a. In this regard, the first and second selection options 404a/404b can each be associated with an initial position. The third selection option 404c can initially be displayed as being positioned at the second display region 410b. In this regard, the third selection option 404c can be associated with an initial position. The fourth selection option 404d can initially be displayed as being positioned at the third display region 410c. In this regard, the fourth selection option 404d can be associated with an initial position. The fifth and sixth selection options 404e/404f can initially be displayed as being positioned at the fourth display region 410d. In this regard, the fifth and sixth selection options 404e/404f can each be associated with an initial position.

The array of selection options 302 can be visually perceived to be position shifted in the first direction 420a such that the first to sixth selection options 404a/404b/404c/404d/404e/404f are position shifted in a right direction relative to their initial position. In this regard, the first direction 420a can, for example, be associated with position shifting in the right direction. For example (not shown), the array of selection options 302 can be visually perceived to be position shifted to the right, relative to the initial position, such that the second selection option 404b can be displayed as being positioned at the second display region 410b, the third selection option 404c can be displayed as being positioned at the third display region 410c, the fourth selection option 404d can be displayed as being positioned at the fourth display region 410d.

Similarly, the array of selection options 302 can be visually perceived to be position shifted in the second direction 420b such that the first to sixth selection options 404a/404b/404c/404d/404e/404f are position shifted in a left direction relative to their initial position. In this regard, the second direction 420b can, for example, be associated with position shifting in the left direction. For example (not shown), the array of selection options 302 can be visually perceived to be position shifted to the left, relative to the initial position, such that the third selection option 404c can be displayed as being positioned at the first display region 410a, the fourth selection option 404d can be displayed as being positioned at the second display region 410b, the fifth selection option 404e can be displayed as being positioned at the third display region 410d.

Furthermore, when any of the first to sixth selection options 404a/404b/404c/404d/404e/404f is position shifted in either the first or second direction 420a/420b to either the second display region 410b or the third display region 410c, the selection option associable with the region of interest 210 can be visually perceived to be gradually graphically expanded as it is positioned shifted to either the second display region 410b or the third display region 410c such that increasing portions of the aforementioned digital image 200 are gradually displayed until an expanded digital image corresponding to the aforementioned digital image 200 is displayed at either the second display region 410b or the third display region 410c.

Conversely, when the aforementioned digital image 200; corresponding to any of the first to sixth selection options 404a/404b/404c/404d/404e/404f associable with the aforementioned region of interest 210, is initially displayed in either the second display region 410b or the third display region 410c and is subsequently position shifted in either the first or second direction 420a/420b to, correspondingly, either the first display region 410a or the fourth display region 410d, the aforementioned digital image 200 displayed at the second display region 410b or the third display region 410c can be visually perceived to be gradually graphically shrunk as it is position shifted to either the first display region 410a or the fourth display region 410d such that decreasing portions of the aforementioned digital image 200 are gradually displayed until a selection option corresponding to the region of interest 210 is displayed at either the first display region 410a or the fourth display region 410d.

In this regard, each of the second and the third display regions 410b/410c, depending on whether the array of selection options 302 is visually perceived to be position shifted in the first or the second direction 420a/420b, can be associated with one or both of the plurality of expansion stages 406 and the plurality of shrinking stages 412.

Figure 5:
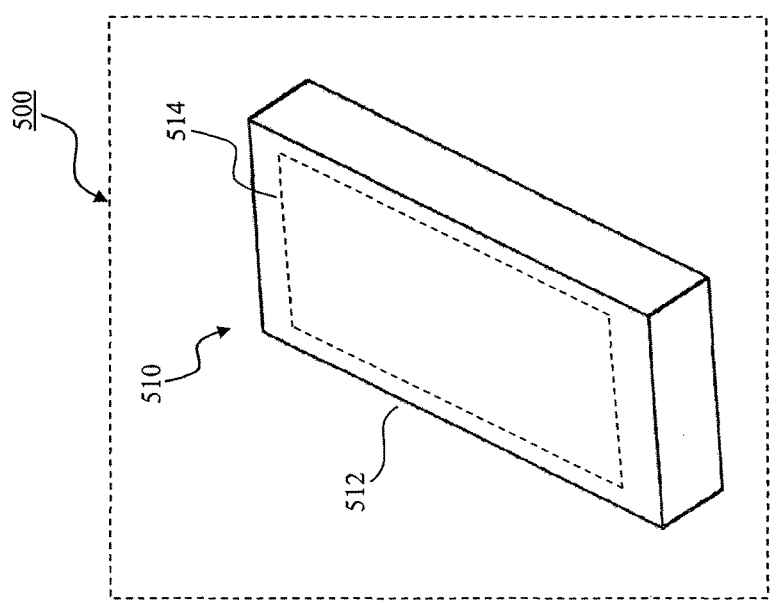
FIG. 5 shows an exemplary implementation of the system of FIG. 1, according to an embodiment of the disclosure.

Referring to FIG. 5, an exemplary implementation 500 of the system 100 is shown. The exemplary implementation 500 can correspond to an electronic device 510 such as an electronic tablet device. The electronic device 510 can be used by a user.

The electronic device 510 can include a casing 512 and a display screen 514. The display screen 514 can correspond to the display portion 108. The casing 512 can be shape and dimensioned in a manner such that the display screen 514 can be viewed by a user.

The display screen 514 can be configured to display one or both of a digital image such as the above discussed digital image 200, the aforementioned array of selection options 302 and, optionally, the aforementioned preview portion 304.

Additionally, one or both of a digital image and the array of selection options 302, and, optionally, the preview portion 304, can be displayed at the display screen 514 as display data via any of the first, second, third and fourth presentation schemes 300a/300b/300c/300d, or any combination thereof.

Furthermore, as mentioned earlier, the first, second, third and fourth presentation schemes 300a/300b/300c/300d, or any combination thereof, can be associated with any of the first, second and third display schemes 400a/400b/400c. Additionally, the first, second, third and fourth presentation schemes 300a/300b/300c/300d, or any combination thereof, can be associated with any combination of the first, second and third display schemes 400a/400b/400c.

The electronic device 510 can further include a storage module (not shown) and a processor (not shown). Additionally, the electronic device 510 can also be associated with a graphics user interface (not shown). The storage module can correspond to the source portion 102 and the processor can correspond to the processing portion 104. The graphics user interface can correspond to the control portion 106.

The casing 512 can be further shaped and dimensioned to carry the storage module and the processor therein. The display screen 514 can be further configured to display the graphics user interface (GUI) as display data. A user of the electronic device 510 can, via the GUI, communicate control signals to the processor. In this regard, the display screen 514 can, for example, be a touch screen based display screen.

As mentioned earlier, graphic processing and display techniques may be associated with providing thumbnails corresponding to a plurality of digital images. However, a digital image may include so large a number of graphic details such that the thumbnail corresponding thereto may be rendered unsuitable for facilitating user browsing for the purpose of selecting a desired digital image from the plurality of digital images.

In this regard, it is appreciable that based on the above discussed system 100, it may not be necessary to provide a thumbnail which is a minimized equivalent of a digital image for the purpose of facilitating user browsing such that a desired digital image can be selected from the plurality of digital images. For example, as discussed above, a selection option from the array of selection options 302 can be based on the region of interest 210. Thus an avenue for facilitating user browsing and selection in an efficient manner can be provided.

Although the foregoing discussion pertaining to region of interest 210 of the digital image 200 and the region of interest associated with each of a plurality of digital images relates to display, at the display portion 108, of a selection list 300, it is appreciable that the region of interest 210 can be useful for other applications such as imaging effects. An example of an imaging effect is lens blur effect.

In one example of the above mentioned lens blur effect, based on the region of interest 210, the processing portion 104 can be configured to produce output signals such that display data produced by the display portion 108 corresponds to a graphic image where the region of interest 210 is in-focus and the remaining portions of the digital image 200 is out of focus. Thus for lens blur effect, the region of interest 210 can, for example, be visually perceived to be in-focus relative to the remaining portions of the digital image 200. Particularly, for the lens blur effect, the remaining portions of the digital image 200 can be visually perceived to be blurred compared to the region of interest 210 and the region of interest 210 can be visually perceived to be focused.

In another example of the above mentioned lens blur effect, based on the region of interest 210, the processing portion 104 can be configured to produce output signals such that display data produced by the display portion 108 corresponds to a graphic image where the region of interest 210 is out of focus and the remaining portions of the digital image 200 is in-focus. Thus for lens blur effect, the region of interest 210 can, for example, be visually perceived to be out of focus relative to the remaining portions of the digital image 200. Particularly, for the lens blur effect, the region of interest 200 can be visually perceived to be blurred compared to the remaining portions of the digital image 200 and the remaining portions of the digital image 200 can be visually perceived to be focused.

As mentioned earlier, output signals can be further processed by, for example, the processing portion 104 for salient based learning in a manner so as to produce indication signals. For example, output signals can be further processed by the processing portion 104 in a manner so as to learn user preference. Thus the indication signals can correspond to the user preference. Salient based learning will be discussed in further detail hereinafter with reference to FIG. 6.

Figure 6:
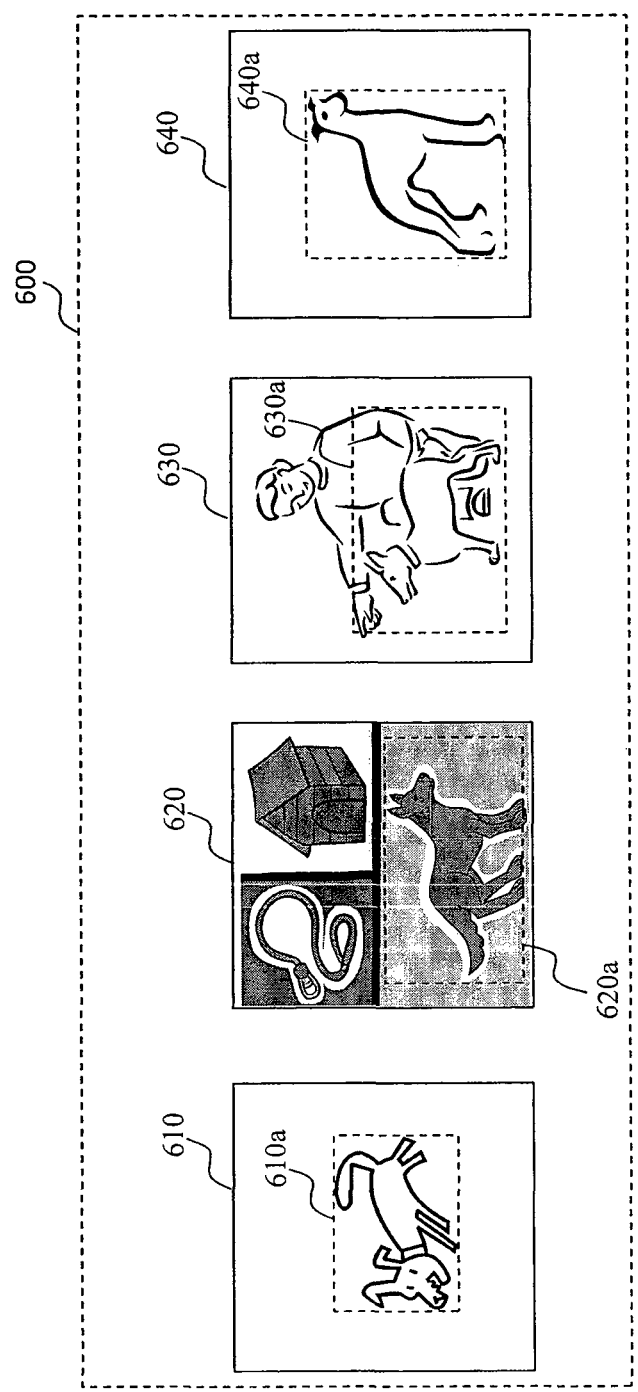
FIG. 6 shows a collection of digital images which can include a plurality of pictures, according to an embodiment of the disclosure.

Referring to FIG. 6, a collection of digital images 600 is shown. The collection of digital images can include a plurality of pictures. Each of the plurality of pictures can be associated with at least one salient region. For example, the collection of digital images 600 can include a first picture 610, a second picture 620, a third picture 630 and a fourth picture 640. The first picture, second picture, third picture and fourth picture 610/620/630/640 can be associated with a first salient region 610a, a second salient region 620a, a third salient region 630a and a fourth salient region 640a respectively.

Earlier discussed with reference to FIG. 2, source data communicated from the source portion 102 can correspond to a digital image 200. Furthermore, at least a portion of the digital image 200 can correspond to a region of interest 210. Additionally, source data communicated from the source portion 102 can also correspond to a plurality of digital images and each of the plurality of digital images can be associated with a region of interest.

Thus the collection of digital images 600 can correspond to the aforementioned plurality of digital images. Each of the, for example, first picture, second picture, third picture and fourth picture 610/620/630/640 can correspond to the aforementioned digital image 200. Additionally, each of the first, second, third and fourth salient regions 610a/620a/630a/640a can correspond to the aforementioned region of interest 210. In this regard, the foregoing pertaining to the digital image 200, the region of interest 210 and the plurality of digital images analogously applies.

As shown, each of the first, second, third and fourth salient regions 610a/620a/630a/640a can be of a certain genre such as animals. For example, the first, second, third and fourth salient regions 610a/620a/630a/640a can relate generally to images of dogs. Thus the aforementioned certain genre can be dogs or, in general, animals. Other examples include genres such as persons, building architectural features, types of objects and scenery.

Salient based learning can, for example, be applicable for determining user preference. Moreover, user preference can be determined in one or both of an automatic based manner and user action based manner. Thus salient based learning can be one or both of automatic based and user action based.

In one embodiment, the processing portion 104 can be configured for salient based learning to, for example, determine user preference in an automatic based manner.

For example, the processing portion 104 can be configured in a manner so as to detect the salient regions 610a/620a/630a/640a associated with the collection of digital images 600. The processing portion 104 can be further configured to determine the genre of the detected salient regions 610a/620a/630a/640a. Based on the determined genre, user preference can be determined. For example, based on the determined genre, user preference can indicate that a user is a dog lover or an animal lover who prefers dogs. In this manner, salient based learning can be automatic based.

In another embodiment, the processing portion 104 can be configured for salient based learning to, for example, determine user preference in a user action based manner.

In one example, a user may spend a long time viewing a particular picture from the collection of digital images 600 as compared to other pictures from the collection of digital images 600. Appreciably, the amount of time spent on a particular picture from the collection of digital images 600 can be indicative of user interest of at least a portion of the particular picture. The at least a portion of the picture can correspond to a salient region. Thus a salient region of the particular picture may be of interest to the user. In this manner, user preference can correspond to a salient region of a particular picture which is of interest to the user. Particularly, the particular picture of interest to the user can be determined by the amount of time the user spends on, for example, viewing the particular picture. In this regard, the aforementioned user action based manner can be time based.

In another example, a user may view a particular picture from the collection of digital images 600 more frequently compared to other pictures from the collection of digital images 600. Appreciably, viewing frequency of a particular picture from the collection of digital images 600 can be indicative of user interest of at least a portion of the particular picture. The at least a portion of the picture can correspond to a salient region. Thus a salient region of the particular picture may be of interest to the user. In this manner, user preference can correspond to a salient region of a particular picture which is of interest to the user. Particularly, the particular picture of interest to the user can be determined by the user viewing frequency of the particular picture. In this regard, the aforementioned user action based manner can be frequency based.

In yet another example, while viewing a particular picture from the collection of digital images 600, a user may zoom in to a portion of the particular picture. Appreciably, zooming in to a portion of the particular picture can be indicative of user interest of at least a portion of the particular picture. The at least a portion of the picture can correspond to a salient region. Thus a salient region of the particular picture may be of interest to the user. Particularly, the salient region of interest to the user can be determined by the user zooming in to a portion of the particular picture. In this regard, the aforementioned user action based manner can be zooming based.

Thus the aforementioned user action based manner can be any one of time based, frequency based and zooming based, or any combination thereof.

In this regard, the processing portion 104 can be configured in a manner so as to detect the salient regions 610a/620a/630a/640a based on the aforementioned user action based manner. The processing portion 104 can be further configured to determine the genre of the detected salient regions 610a/620a/630a/640a. Based on the determined genre, user preference can be determined. For example, based on the determined genre, user preference can indicate that a user is a dog lover or an animal lover who prefers dogs. In this manner, salient based learning can be user action based.

As mentioned earlier, output signals can be further processed by, for example, the processing portion 104 for salient based learning in a manner so as to produce indication signals which can correspond to user preference. The indication signals can be communicated from the processing portion 104 to the output module 110. Further mentioned earlier, the output module 110 can be one or both of hardware based and software based. When hardware based, the output module 110 can, for example, be in the form of a device. When software based, the output module 110 can, for example, be in the form of a software application.

The output module 110 can, in one example, be a device capable of sound production such as a mobile phone. The mobile phone can be associated with a ringtone for alerting its user of an incoming phone call. Based on the indication signals communicated from the processing portion 104, the ringtone can be customized. For example, where the indication signals correspond to user preference and the user preference is based on determined genre indicating that the user is a dog lover, the ringtone can be related to a sound associated with a dog such as a barking sound.

The output module 110 can, in another example, be one or both of a device and a software application capable of data sorting.

The data can, in one example, be a contact list which includes a list of names and a corresponding list of contact numbers. Based on the indication signals communicated from the processing portion 104, the contact list can be sorted in accordance with user preference. For example, the contacts list can be sorted in a manner such that the name and corresponding contact number of a user's favorite person is listed first followed by other names and corresponding contact numbers in the contact list.

The data can, in another example, be a plurality of pictures located in a database. Based on the indication signals communicated from the processing portion 104 and where the indication signals correspond to user preference, the plurality of pictures located in a database can be automatically sorted such that a user's preferred pictures in the plurality of pictures can, be distinguished from other pictures in the plurality of pictures. For example, where the user preference is based on determined genre indicating that the user is a dog lover, pictures in the plurality of pictures corresponding to an image of a dog can be sorted and stored in a folder so as to distinguish the user's preferred pictures from the other pictures in the plurality of pictures.

The output module 110 can, in yet another example, be a search engine which can be configured to accept user input corresponding to one or more search terms. The search engine can be further configured for operation with, for example, a database, a World Wide Web (WWW) based environment or a map based environment.

In one example, in the WWW based environment, a user can provide search terms such as "favorite things" to the search engine. In this regard, the search engine can be configured to provide search results based on the indication signals communicated from the processing portion 104.

In another example, in a map based environment such as a GPS device where a map of an environment or location can be displayed, a user can provide search terms such as "favorite things within 5 Km" to the search engine. In this regard, the search engine can be configured to provide search results based on indication signals communicated from the processing portion 104. Specifically, the search engine can be configured to provide location based, perimeter based or vicinity based search results.

The output module 110 can, in yet another example, be an application which can be configured to automatically generate a graphic image based on the indication signals communicated from the processing portion 104.

The generated graphic image can, in one example, be displayed as a background image or wallpaper for a display desktop in association with, for example, a graphics user interface displayed at a display screen of a computer. For example, where the indication signals correspond to user preference and the user preference is based on determined genre indicating that the user is a dog lover, the generated graphic image can be associated with an image of a dog.

The generated graphic image can, in another example, be a selection icon displayable at the display desktop of the, for example, display screen of the computer. The selection icon can be used to access a file such as a video file. Where the indication signals correspond to user preference based on determined genre indicating that the user is a dog lover and the video file includes content related to dogs, the selection icon can be associated with an image of a dog.

The output module 110 can, in yet a further example, be one or both of a device and a software application configurable for operation with a gaming application. The gaming application can be associated with one or more attributes such as game themes, avatar and background music. Based on the indication signals communicated from the processing portion 104, one or more of the attributes associated with the gaming application can be influenced or customized. For example, where the indication signals correspond to user preference and the user preference is based on determined genre indicating that the user is dog lover, the avatar can be associated with an image of a dog.

Figure 7:
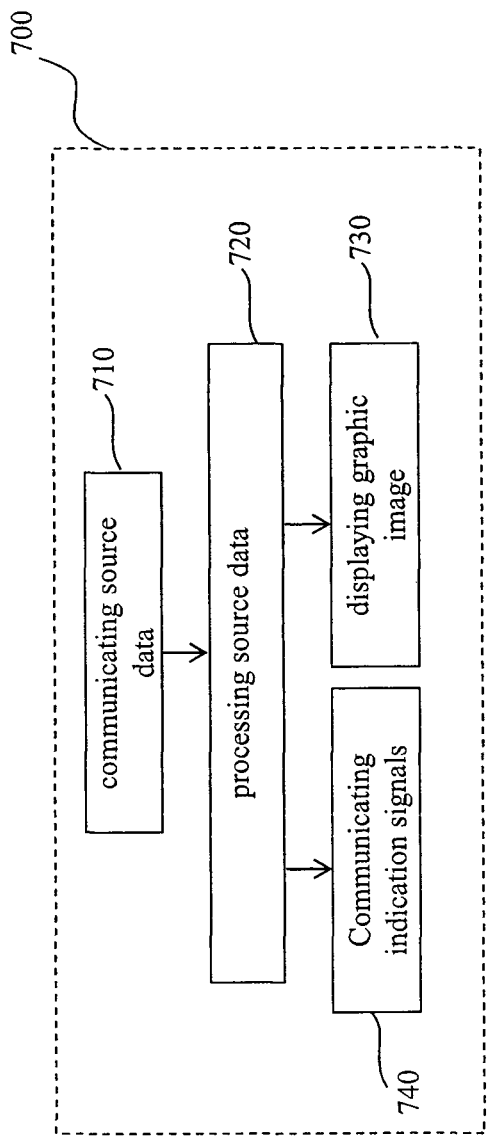
FIG. 7 shows a flow diagram for a method which can be implemented in association with the system of FIG. 1, according to an embodiment of the disclosure.

Referring to FIG. 7, a method 700 for graphic processing and display of display data can be implemented in association with the system 100.

The method 700 can include communicating source data 710. Source data can be communicated from the source portion 102.

The method 700 can also include processing source data 720. Particularly, source data communicated from the source portion 102 can be received and processed by the processing portion 104 in a manner so as to produce output signals. More particularly, the processing portion 104 can be configured to process source data via one or both of the first processing scheme and the second processing scheme.

The method 700 can, in one embodiment, further include displaying graphic image 730. Particularly, output signals can be communicated from the processing portion 104 to the display portion 108. The display portion 108 can be configured to receive and process output signals from the processing portion 104 in a manner so as to produce display data. Display data can be displayed via the display portion 108 as graphic image.

For example, display data can be displayed via the display portion 108 as graphic image via any of the first, second, third and fourth presentation schemes 300a/300b/300c/300d, or any combination thereof. Earlier mentioned, the first, second, third and fourth presentation schemes 300a/300b/300c/300d, or any combination thereof, can be associated with any of the first, second and third display schemes 400a/400b/400c. Additionally, the first, second, third and fourth presentation schemes 300a/300b/300c/300d, or any combination thereof, can be associated with any combination of the first, second and third display schemes 400a/400b/400c.

The method 700 can, in another embodiment, further include communicating indication signals 740. Particularly, output signals can be further processed by, for example, the processing portion 104 in a manner so as to produce indication signals. Indication signals can be communicated from the processing portion 104 to the output module 110.

The method 700 can, in yet another embodiment, further include displaying graphic image 730 and communicating indication signals 740. In this regard, the foregoing pertaining to displaying graphic image 730 and communicating indication signals 740 analogously applies.

In the foregoing manner, various embodiments of the disclosure are described for addressing at least one of the foregoing disadvantages. Such embodiments are intended to be encompassed by the following claims, and are not to be limited to specific forms or arrangements of parts so described and it will be apparent to one skilled in the art in view of this disclosure that numerous changes and/or modification can be made, which are also intended to be encompassed by the following claims.

The invention claimed is:

1. An electronic device configurable for processing source data corresponding to at least one digital image, the electronic device comprising:
   a processing portion configurable for salient based learning by manner of:
      receiving and processing source data in a manner so as to produce output signals associable with a portion of the at least one digital image, the portion of the at least one digital image being associable with a region of interest;

detecting salient region based on the region of interest corresponding to user preference determined by a user action based manner, wherein the user action based manner comprises one or a combination of time spent viewing, frequency of viewing, and zooming action;

determining genre of the detected salient region; and processing the output signals to produce indication signals corresponding to user preferred genre which is based on the determined genre of the detected salient region, wherein the indication signals are communicable for further processing to generate at least one of user preferred genre visual output displayable as a background image on a display screen and audio output which is of user preferred genre.

2. The electronic device as in claim 1, further comprising:

a source portion for communicating source data, the source portion being coupled to the processing portion in a manner such that source data is communicable to the processing portion for processing to produce output signals; and a display portion via which display data is displayable as graphic image, the display portion being coupled to the processing portion in a manner so as to receive the output signals, wherein the display portion is configurable to receive and process the output signals in a manner so as to produce display data.

3. The electronic device as in claim 2 further comprising:

a control portion coupled to the processing portion, the control portion being configurable to communicate control signals to the processing portion.

4. The electronic device as in claim 3, wherein the graphic image corresponds to a selection list having at least one selection option, the at least one selection option corresponding to the region of interest, wherein the electronic device is operable by a user in a manner such that the at least one selection option is selectable by the user such that the graphic image further corresponds to the at least one digital image, and wherein control signals are communicable from the control portion for selecting the at least one selection option.

5. The electronic device as in claim 3, wherein the processing portion is configurable for processing source data via at least one of a first processing scheme and a second processing scheme, wherein the first processing scheme corresponds to processing of source data via automatic detection based processing, and wherein the second processing scheme corresponds to processing of source data via manual detection based processing.

6. The electronic device as in claim 5, wherein in the first processing scheme, the processing portion is associable with at least one of default settings and user preference settings, each of the default settings and user preference settings being indicative of the region of interest such that the processing portion is configurable to produce output signals associable with the region of interest in an automatic manner.

7. The electronic device as in claim 5, wherein in the second processing scheme, control signals are communicable from the control portion in a manner such that a portion of the at least one digital image, corresponding to the region of interest, is manually selected.

8. The electronic device as in claim 5, wherein each of the first and second processing schemes is associable with at least one of:

salient region detection and segmentation based techniques; and cropping based techniques.

9. The electronic device as in claim 3, wherein the source data corresponds to a plurality of digital images, wherein the processing portion is configurable for receiving and processing the source data in a manner so as to produce output signals associated with a portion of each of the plurality of digital images, each of a portion of each of the plurality of digital images being associable with a region of interest, the output signals being based upon to produce display data displayable as graphic image corresponding to a selection list having a plurality of selection options, and wherein a selection option from the plurality of selection options is associable with a region of interest associable with a digital image from the plurality of digital images.

10. The electronic device as in claim 9, wherein the selection list corresponds to an array of selection options comprising the plurality of selection options.

11. The electronic device as in claim 10, wherein control signals are communicable from the control portion in a manner so as to select a selection option from the selection list such that the graphic image further corresponds to a digital image associable the selected selection option.

* * * * *